United States Patent

Kornylak

[15] 3,642,118
[45] Feb. 15, 1972

[54] MAGNETIC CONVEYOR

[72] Inventor: Andrew T. Kornylak, 400 Heaton Street, Hamilton, Ohio 45011

[22] Filed: Feb. 13, 1970

[21] Appl. No.: 11,141

[52] U.S. Cl. ............................................. 198/41, 198/193
[51] Int. Cl. ........................................................ B65g 17/46
[58] Field of Search ........................................ 198/41, 193

[56] References Cited

UNITED STATES PATENTS 3,308,925   3/1967   Alfredeen ........................... 198/41

FOREIGN PATENTS OR APPLICATIONS 945,887   1/1964   Great Britain ........................... 198/41

Primary Examiner—Evon C. Blunk
Assistant Examiner—Alfred N. Goodman
Attorney—Jay M. Cantor

[57] ABSTRACT

A conveyor for moving small ferrous items. An endless flexible belt is supported by one surface of a framework made of a nonmagnetic material. Parallel bars of magnetic material are secured to the framework opposite the belt-supporting surface. Permanent magnets are secured to the bars to provide a continuous magnetic field for attracting the items onto the belt. The belt is provided with parallel strips of high-permeability corresponding to the underlying magnetic bars. The strength of the magnetic flux passing through the items is thus increased.

7 Claims, 6 Drawing Figures

PATENTED FEB 15 1972
3,642,118
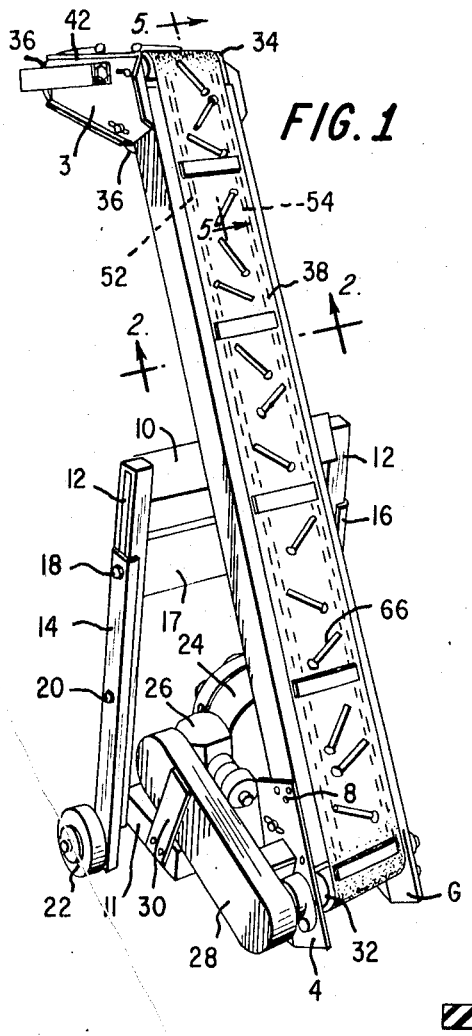
FIG. 1
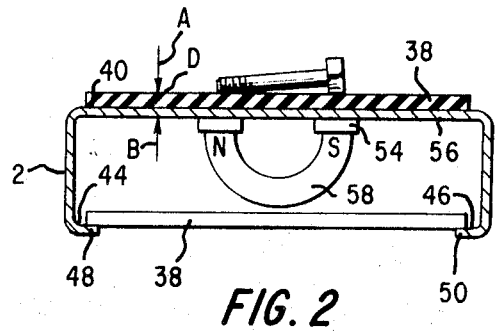
FIG. 2
FIG. 3
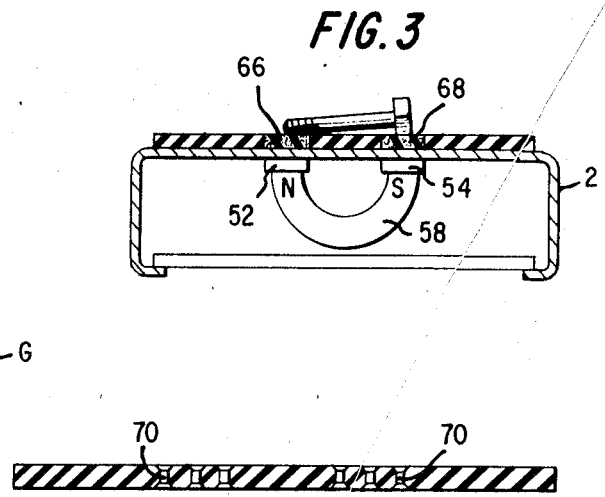
FIG. 4
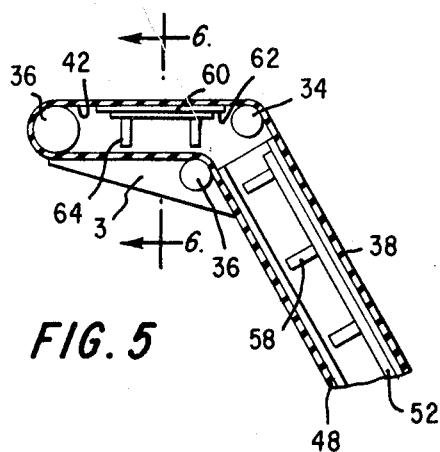
FIG. 5
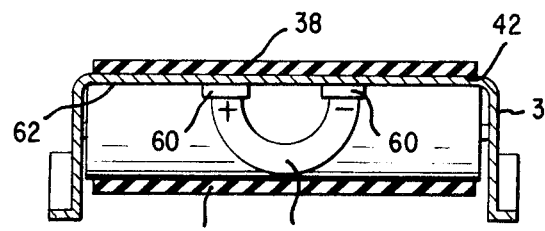
FIG. 6
INVENTOR
Andrew T. Kornylak
BY Harold L. Halpert
Agent

MAGNETIC CONVEYOR

This invention relates to a conveyor and more particularly to a magnetic conveyor having a belt with areas of high permeability to enhance the effectiveness of the permanent magnets normally used in conveyors for moving small ferrous items.

Magnetic conveyors commonly used for lifting small parts in inclined paths are well known. The capability of such a belt to move a part upward depends on the strength of the magnets and the ability of the magnetic flux to pass through the layers of metal and belt and into the part being conveyed. The attraction of the part to the belt results in enough friction or force between the belt and the part to cause the part to move with the belt. Should the effect of the magnet be reduced by excessive belt thickness, the frictional force is reduced and the part tends to slide backwards on the belt. Further, if the part does not have a broad base to contact with the belt, it may have a tendency to tumble and roll down the belt rather than be held firmly to the belt. It is, therefore, an object of this invention to improve this magnetic attraction by increasing the permeability of the belt through which the magnetic flux must pass.

It is a further object of this invention to provide a conveyor as aforesaid which has sufficient magnetic attraction to lift ferrous items in sharp vertical inclines.

It is a further object of this invention to produce a conveyor as aforesaid which can discharge the items in a substantially horizontal plane to permit ease of handling.

It is a further object of this invention to produce a conveyor as aforesaid which can be loaded close to the floor.

These and other objects of the invention will become manifest upon reading the following description in conjunction with the accompanying drawing wherein FIG. 1 illustrates the invention used in a vertical conveyor, FIG. 2 is a section taken along the line 2—2 of FIG. 1 and illustrates one form of belt and magnet, FIG. 3 illustrates a form of belt having zones of high-magnetic permeability, FIG. 4 illustrates another form of belt having zones of high magnetic permeability, FIG. 5 is a section taken on the line 5—5 of FIG. 1, and FIG. 6 is a section taken on the line 6—6 of FIG. 5.

With reference to the drawing there is disclosed a frame comprising a channel 2 and a bracket 3 secured to one end of the channel. The channel and bracket are made of nonmagnetic material, such as aluminum. A pair of legs 4,6 are secured to opposite sides of the channel by rivets 8 to provide a support for the frame on the floor.

A support bar 10 is vertically adjustable to regulate the inclination of the channel. The bar is pivotally mounted on the ends of a pair of arms 12 and a platform 11 is secured to the other ends of the arms for supporting the drive mechanism for the belt. A brace 17 is secured to the arms to supply rigidity to the structure. Arms 12 are slidably mounted in supports 14,16 of U-shaped cross section and are secured thereto by a lock mechanism (not shown) by bolts 18,20. Channel 2 leans against the bar 10 and will change its inclination as the bar is raised or lowered.

The drive mechanism comprises a motor 24 connected through a gear transmission 26 for driving a chain and sprocket mechanism mounted in casing 28. The casing is secured to the platform by a plate 30 welded thereto and riveted to the platform.

A pulley 32 is mounted for rotation between legs 4 and 6 and is driven by the chain and sprocket mechanism to drive a belt 38. A pulley 34 is mounted for rotation in one end of bracket 3 at the upper end of channel 2 and a pulley 36 is mounted for rotation at the other end of bracket 3. Pulley 34 is magnetized with one magnetic pole at one end and the other magnetic pole at the other end for a purpose to be explained below. A third pulley 36 is mounted in bracket 3 below pulley 34.

The belt 38 is trained over pulleys 32,34,36, and 38. The pulleys 32 and 34 are aligned with surface 40 of channel 2 to support the belt in the inclined plane. Pulleys 34 and 36 are aligned with surface 42 of bracket 3 to support the belt in a plane intersecting the inclined plane. Pulley 36 is aligned with surfaces 44,46 of legs 48,50 of channel 2 to guide the belt onto the surfaces for support during the return run of the belt.

A pair of parallel bars 52,54 of steel are secured to surface 56 of channel 2 by welding or brackets (not shown) and extend the length of the channel. A plurality of permanent magnets 58 are secured to the steel bars and spaced lengthwise of the bars to provide a continuous magnetic pole extending the length of the channel. A pair of parallel bars 60 of steel coplanar with bars 52,54 are secured to the undersurface 62 of bracket 3 and support magnets 64.

In operation, the magnetic field between bars 52,54 created by magnets 58 will attract the ferrous items, such as bolts 66, against the belt with sufficient force to overcome the effect of gravity. The moving belt will convey the items to the top of the conveyor. The magnetic pulley 34 will hold the items as the belt is bent about the pulley to form a horizontal run. The field between bars 60 will retain the items from escape from the belt along this run of the belt but will release the magnetic attraction as the items are conveyed over pulley 36 to allow discharge from the conveyor.

The gap D between the carrying surface of the belt and pole pieces 52,54, as illustrated in FIG. 2 between arrows A–B, is a zone of low permeability and reduces the strength of the magnetic field. The load carrying capacity of the magnet and belt arrangement can be increased by reducing this magnetic gap. The belt is therefore formed throughout its length with a pair of zones 66,68 of high-permeability spaced apart a distance equal to the distance between the pole pieces 52,54.

In the form of the invention disclosed in FIG. 3 the zones are formed by embedding iron particles in the belt.

In the form of invention illustrated in FIG. 4 the zones are formed by rivets 70. If desired, ferrous staples or other filaments which extend through the belt can be used.

I claim:

1. A conveyor belt comprising a flat web of flexible nonmagnetizable material of substantially uniform thickness having embodied therein normally unmagnetized material in longitudinally extending zones which are spaced transversely, said material being permeable to magnetic flux, and magnetizing means in flux coupling relation with the magnetic flux permeable material of the zones for imparting thereto magnetic polarities of opposite sign, respectively.

2. A conveyor belt according to claim 1 in which the magnetizing means comprises at least one stationary permeable magnet, the poles of which are in flux coupling relation with the material of the respective zones, and means for moving the belt longitudinally.

3. A conveyor belt according to claim 2 in which an elongated strip of magnetizable material is interposed between each pole of the magnet and the belt, the elongated strips extending parallel to the belt and underlying the magnetic flux permeable material in the respective zones.

4. A conveyor belt according to claim 1 in which the magnetizing means comprises a plurality of stationary, longitudinally spaced permanent magnets at the underside of the belt with their pole pieces in flux coupling relation with the material of the respective zones of the belt, and means for moving the belt longitudinally.

5. A conveyor belt according to claim 4 including elongated strips of magnetizable material extending parallel to the belt and interposed between the pole faces of the magnets and the material in the respective zones of the belt.

6. A conveyor according to claim 2 in which the magnetically permeable material of the belt is in the form of elongated individual objects embedded in the belt.

7. A conveyor according to claim 1 in which the magnetically permeable material of the belt is in the form of staples having their legs embedded in the belt.

* * * * *